(12) United States Patent
Juenger et al.

(10) Patent No.: US 8,888,910 B2
(45) Date of Patent: Nov. 18, 2014

(54) ENCAPSULATED ZINC COMPOUNDS AND METHODS FOR PREPARING AND USING SAME

(75) Inventors: Maria C. G. Juenger, Austin, TX (US); Sarah Clare Taylor Lange, Austin, TX (US); Kyle Riding, Manhattan, KS (US)

(73) Assignees: Board of Regents of the University of Texas System, Austin, TX (US); Kansas State University Research Foundation, Manhattan, KS (US)

( * ) Notice: Subject to any disclaimer, the term of this patent is extended or adjusted under 35 U.S.C. 154(b) by 0 days.

(21) Appl. No.: 14/006,782

(22) PCT Filed: Mar. 23, 2012

(86) PCT No.: PCT/US2012/030280
§ 371 (c)(1),
(2), (4) Date: Sep. 23, 2013

(87) PCT Pub. No.: WO2012/129476
PCT Pub. Date: Sep. 27, 2012

(65) Prior Publication Data
US 2014/0007796 A1    Jan. 9, 2014

Related U.S. Application Data

(60) Provisional application No. 61/467,114, filed on Mar. 24, 2011.

(51) Int. Cl.
*C04B 14/36* (2006.01)
*C04B 18/00* (2006.01)
*C04B 18/02* (2006.01)
*C04B 28/02* (2006.01)
*C04B 18/04* (2006.01)

(52) U.S. Cl.
CPC ........... *C04B 18/0481* (2013.01); *C04B 18/023* (2013.01); *C04B 28/02* (2013.01)
USPC ........... 106/706; 106/714; 106/718; 106/733; 106/790; 106/811; 106/812

(58) Field of Classification Search
CPC .... C04B 14/30; C04B 14/36; C04B 18/0481; C04B 22/0006
USPC .................. 106/706, 714, 718, 790, 811, 812
See application file for complete search history.

(56) References Cited

U.S. PATENT DOCUMENTS

| | | | |
|---|---|---|---|
| 5,958,131 A * | 9/1999 | Asbridge et al. | 106/718 |
| 7,497,904 B2 * | 3/2009 | Dulzer et al. | 106/712 |
| 8,317,916 B1 * | 11/2012 | Dongell | 106/705 |

FOREIGN PATENT DOCUMENTS

| | | | | |
|---|---|---|---|---|
| CN | 101269264 A * | 9/2008 | | A62D 3/30 |
| EP | 2298709 A1 * | 3/2011 | | C04B 20/10 |

* cited by examiner

*Primary Examiner* — Anthony J Green
(74) *Attorney, Agent, or Firm* — Ballard Spahr LLP

(57) ABSTRACT

Disclosed are encapsulated zinc compounds, together with methods for preparing and use the same. Also disclosed are methods for mixing the encapsulated zinc mixtures with a cement, and the resulting concrete compositions.

12 Claims, 1 Drawing Sheet

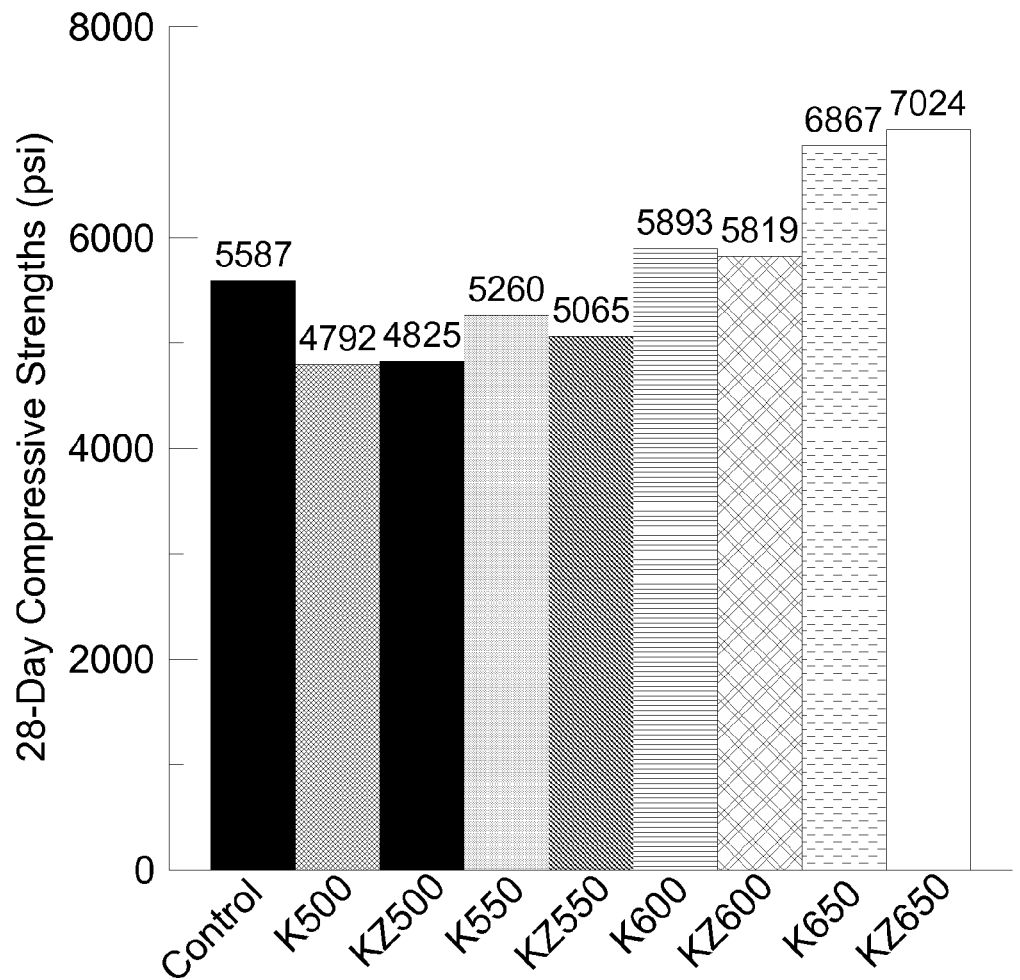

US 8,888,910 B2

ENCAPSULATED ZINC COMPOUNDS AND METHODS FOR PREPARING AND USING SAME

CROSS-REFERENCE TO RELATED APPLICATIONS

The present application is a U.S. National Phase Application of International Application No. PCT/US2012/030280, filed Mar. 23, 2012, which claims priority to U.S. Patent Application No. 61/467,114, filed Mar. 24, 2011, all of which applications are incorporated herein fully by this reference.

BACKGROUND

1. Technical Field

The present disclosure relates to encapsulated zinc compounds, and methods for the preparation and use thereof.

2. Technical Background

Encapsulation of waste materials into concrete is a common remediation method, but some materials can interact with cement and delay setting time or adversely affect the strength of the resulting concrete. For example, low concentrations of zinc containing compounds, such as, for example, zinc oxide and zinc salts, can significantly delay setting time and reduce the evolution of heat in a concrete material.

Concrete containing zinc compounds can suffer from long setting times and reduced functionality. Thus, there is a need to address the aforementioned problems and other shortcomings associated with the concrete remediation of waste materials. These needs and other needs are satisfied by the compositions and methods of the present disclosure.

SUMMARY

In accordance with the purpose(s) of the invention, as embodied and broadly described herein, this disclosure, in one aspect, relates to encapsulated zinc compounds and methods for the preparation and use thereof.

In one aspect, a method is disclosed for preparing a concrete composition, the method comprising contacting a calcined clay, a zinc containing compound, and a cement.

In another aspect, a composition is disclosed comprising a calcined clay, a zinc containing compound, and cement, wherein at least a portion of the zinc containing compound is at least partially encapsulated by the calcined clay.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

FIG. 1 illustrates the compressive strengths of inventive and comparative mortar cubes after 28 days.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

A. DEFINITIONS

As used in the specification and the appended claims, the singular forms "a," "an" and "the" include plural referents unless the context clearly dictates otherwise. Thus, for example, reference to "a graphene sheet," "an electrode," or "an electrolyte" includes mixtures of two or more graphene sheets, electrodes, or electrolytes, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or can not occur, and that the description includes instances where said event or circumstance occurs and instances where it does not.

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds can not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly discussed above, the present disclosure relates to zinc compounds and methods for the remediation and/or disposal thereof. Encapsulation of waste materials in concrete is a conventional remediation method. For some materials, encapsulation in concrete can be an effective way to dispose of waste and protect the environment. For other materials, such as, for example, zinc containing compounds, the waste materials can interact with components in the concrete, such as, for example, cement. The interactions can range from slow setting and/or curing time for the concrete to reduced functionality and/or strength of the resulting concrete. For example, zinc compounds can delay the setting time of concrete and can affect the evolution of heat in the curing concrete. Even relatively low concentrations of zinc salts or oxides can be problematic, making concrete a less favorable remediation option.

Specifically, remediation methods for zinc waste materials in concrete can suffer from altered cement hydration reactions. The resulting long induction periods and altered heat evolution profiles can significantly affect the resulting concrete, limiting its use in certain applications.

Zinc Containing Waste Material

Zinc is one of the most commonly used metals in the world. Accordingly, most zinc containing waste streams are a result of human activities, such as, for example, mining, purification of zinc, lead, and cadmium ores, steel production, coal burning, and the burning of other waste streams. Major industrial uses of zinc include galvanizing processes for steel, alloy production, rubber compounding, wood preservation, and the manufacturing and dyeing of fabrics and paints. Electric arc furnaces (EAF) also produce dust containing zinc, such as, for example, zinc oxides. This EAF dust can be recycled or processed to obtain zinc.

Zinc can enter the environment as a pollutant in the discharge from galvanizing plants, as a leachate from galvanized structures and natural ores, and from municipal waste treatment plants. Zinc is also frequently found in hazardous waste sites in the form of chlorides, oxides, sulfates, and sulfides.

In one aspect, the waste material of the present invention can comprise one or more zinc containing compounds, such as, for example, zinc chloride, zinc sulfate, zinc sulfide, other zinc salts, zinc oxides, or a combination thereof. In one aspect, chloride salts, such as, for example, zinc chloride, can be problematic in concrete compositions. In particular, the presence of chlorides can result in corrosion of reinforcing materials, such as rebar, in reinforced concrete. Thus, in one aspect, the zinc containing compound does not comprise zinc chloride and/or a chloride salt. In another aspect, the zinc containing compound does not have more than a trace amount of zinc chloride and/or a chloride salt. In a specific aspect, the waste material comprises zinc oxide. It should be understood that a zinc waste stream can comprise one or multiple zinc compounds and can, in various aspects, also contain other non-zinc containing compounds.

In one aspect, a zinc containing compound from a zinc waste stream can be utilized as-is, without processing or treatment. In other aspects, all or a portion of a zinc containing waste stream can be subjected to one or more processing steps prior to contacting with clay.

Clay

In one aspect, the present invention combines a zinc waste material with calcined clay. In another aspect, the resulting mixture of zinc waste material and calcined clay can be used as a supplementary cementitious material (SCM) in concrete.

In one aspect, the zinc containing compound is contacted with a calcined clay. In one aspect, the clay can comprise an individual type of clay, such as, for example, a kaolinite clay. In another aspect, the clay can comprise a mixture of two or more types of clay. In various aspects, the clay can comprise illite, montmorillinite, kaolinite, or a combination thereof. In a specific aspect, the clay can comprise a pure or substantially pure kaolinite clay. It should be noted that the purity of a clay or mixture of clays is not limiting, and that both pure and/or impure clays or mixtures of clays can be utilized in the methods of the present invention. In one aspect, the clay is an impure clay or mixture of clays. In another aspect, the clay is pure or substantially pure, such as, for example, about 99.9% kaolinite clay.

Prior to contacting with the zinc containing compound, a clay should be calcined. In one aspect, a previously calcined clay can be provided. In another aspect, a clay can be subjected to a calcination step. The particular calcination conditions to which a clay is subjected can vary and the present invention is not intended to be limited to any particular calcination conditions. In one aspect, a clay can be heated to at least about 500° C. for a period of at least about one hour.

The particle size of a clay can be any particle size or distribution of particle sizes suitable for use in the methods of the present invention. In one aspect, a clay or calcined clay can be used, as received, without any processing to a particular particle size. In another aspect, all or a portion of a clay or calcined clay can be processed, for example, ground, to a size approximately equal to the size of the cement particles to be used. It should be noted that particle sizes of clay and/or cement materials are distributional properties, and that the average particle size and/or standard deviation of particle sizes can vary. Accordingly, the present invention is not intended to be limited to any particular particle size clay.

Zinc—Cement Composition

Prior to mixing concrete, the zinc containing compounds can be contacted with a calcined clay, such as, for example, metakaolin. In one aspect, the zinc containing compound and calcined clay can be admixed. In another aspect, the zinc containing compound and calcined clay can be mixed so as to achieve a uniform or substantially uniform mixture. In yet another aspect, the zinc containing compound and calcined clay can be mixed such that at least a portion of zinc containing particles are at least partially encapsulated by the calcined clay. In still another aspect, the zinc containing compound and calcined clay can be mixed such that at least a portion of zinc containing particles are fully or substantially encapsulated by the calcined clay. In yet another aspect, all or substantially all of the zinc containing compounds and/or particles are encapsulated by the calcined clay so as to minimize and/or prevent interaction with cement.

In one aspect, the mixture of one or more zinc containing compounds and calcined clay can be mixed with a cement. In another aspect, the mixture of zinc containing compounds and calcined clay can be held, packaged and held for late, or distributed for use in cement mixtures. In another aspect, the zinc containing waste and calcined clay can be contacted with a cement mixture at the same time.

In another aspect, a mixture of one or more zinc containing compounds with a cement, a clay, such as a calcined clay, and an additional filler material, can be prepared. In such an aspect, the additional filler material can comprise limestone, an inert filler, zeolite, silica fume, flyash, blast furnace slag, such as ground-granulated blast furnace slag, or a combination thereof. In one aspect, the mixture comprises one or more zinc containing compounds, cement, calcined clay, and fly-ash. In another aspect, the mixture comprises one or more zinc containing compounds, cement, calcined clay, and limestone. In another aspect, the mixture comprises one or more zinc containing compounds, cement, calcined clay, and fly-ash. In another aspect, the mixture comprises one or more zinc containing compounds, cement, calcined clay, and blast furnace slag. In yet another aspect, the mixture comprises one or more zinc containing compounds, cement, calcined clay, and silica fume.

The particular order of contacting and/or mixing of components is not limiting, provided that the resulting composition comprises a calcined clay, a zinc containing compound, and a cement. In one aspect, a zinc containing compound can be contacted and/or mixed with a calcined clay. In another aspect, a zinc containing compound can be contacted and/or mixed with an uncalcined clay, and the resulting combination can be calcined. In such an aspect, the chemical composition of the zinc containing compound can change, for example, to an oxide during the heat treatment. In one aspect, heat treating a zinc containing compound, for example, zinc oxide, with a clay, for example, kaolinite, can reduce the setting time of the resulting concrete composition.

In another aspect, the zinc containing compound can be mixed with concrete substituents, such as, for example, clay, cement, aggregate, and water, to form a concrete composition.

The amount of zinc added to a concrete composition can vary. In one aspect, the amount of zinc, for example, from a zinc waste stream, can affect the hardening time of the resulting concrete mixture. In one aspect, a clay-zinc composition can comprise up to about 2.5 wt. % zinc, for example, about 0, 0.1, 0.2, 0.3, 0.4, 0.5, 0.75, 1, 1.25, 1.5, 1.75, 2, 2.25, or 2.5 wt. % of a zinc containing compound, such as zinc oxide. In other aspects, a clay-zinc composition can comprise greater than about 2.5 wt. % of a zinc containing compound. In another aspect, a cement composition can comprise up to about 15 wt. % of a clay-zinc composition, for example, about 1, 2, 3, 4, 5, 6, 7, 8, 9, 10, 11, 12, 13, 14, or 15 wt. % of a clay-zinc composition. In another aspect, a cement composition can comprise greater than about 15 wt. % of a clay-zinc composition. In a specific aspect, a cement composition can comprise about 10.7 wt. % of a clay-zinc composition. For example, a cement sample comprising 1 wt. % zinc oxide can remain liquid for at least about 56 hours, whereas a cement sample comprising about 1.8 wt. % metakaolin and about 1 wt. % zinc oxide can harden after about 16 hours. Thus, in another aspect, the hardening time of a resulting mixture can be adjusted by modifying the amount of clay and/or zinc containing compound present.

In one aspect, use of the inventive combination of zinc waste and calcined clay can reduce and/or prevent the cement hydration problems described above. In another aspect, the use of an encapsulated zinc material as a supplemental cementitious material can increase the reactivity of cement-metakaolin hydration. In another aspect, the use of such a supplemental cementitious material can increase reactivity without adversely affecting the setting time for the resulting concrete.

In another aspect, use of the inventive combination of zinc waste and calcined clay can restore and/or improve the functionality of concrete materials by, for example, enhancing the non-structural functionality of the concrete by reacting outdoor pollutants through photocatalysis with zinc oxide present in the composition. In one aspect, the presence of zinc oxide in a concrete mixture can be advantageous by reacting, for example, photocatalytically, with atmospheric pollutants, such as, for example, NOx compounds.

In another aspect, the inventive zinc waste-calcined clay-cement mixtures samples can reduce radon emissions from concrete materials. It is estimated that concrete exhalation of radon and progenies contributes to an estimated 30% of the total indoor radioactive pollution. Concrete constituents of aggregate, and portland cement can contain uranium ($^{238}$U), radium ($^{226}$Ra) and/or thorium ($^{232}$Th) radionuclides, which have decay chain products of exhalable Radon gas ($^{222}$Rn) and non-exhalable progenies, Polonium-218 and Polonium-214 ($^{218}$Po, $^{214}$Po). These non-exhalable progenies are credited to be the second leading cause of lung cancer for Americans. A common cement replacement, fly ash, is formed from 90% inorganic, incombustible residue from the burning of coal. When used in cement, fly ash can amplify any naturally occurring radioactivity. In addition, fly ash can contain up to ten times the level of uranium and thorium of un-burned coal. In one aspect, the zinc-clay composition of the present invention can block at least a portion of the radioactivity and/or radon emission. In another aspect, use of the waste zinc-clay component can allow for a mixture of zinc waste-fly ash-calcined clay-cement that can maintain and/or reduce indoor radon exposure from concrete.

In another aspect, use of a supplemental cementitious material containing encapsulated zinc compounds can reduce the amount of cement needed for a given concrete mixture. In such an aspect, the amount of carbon dioxide emitted and energy consumed from cement production can be reduced. For example, use of the inventive compositions can provide a reduction in $CO_2$ emissions during the manufacturing process of up to, for example, about 280 lb $CO_2$ per ton of cement.

In still another aspect, an encapsulated zinc containing supplemental cementitious material can act as a corrosion inhibitor for rebar and/or other structural elements in contact with a resulting concrete.

In various aspects, the waste zinc-calcined clay-cement mixtures described herein can be used for all concrete applications, including non-structural and structural elements. In one aspect, an inventive ZnO-metakaolin-cement compositions can provide comparable early compressive strengths (psi) of to a Type I portland cement at 3-days and an increase in strength of ≈22% (psi) at 28-days.

In another aspect, use of the inventive composition can reduce the amount of clay required for a cement composition, resulting in significant cost savings in materials and energy costs needed to calcine the clay. In addition, the energy savings and relative abundance of zinc waste streams suitable for use in the inventive compositions described herein can be beneficial for the preparation of alternative cementitious materials in developing and/or third world countries.

Thus, the use of an encapsulated zinc material in a cement mixture for producing concrete can be advantageous in remediation of the zinc waste stream and/or for producing a concrete that can reduce atmospheric pollutants.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

In a first example, a zinc containing compound was added to raw kaolinite to form multiple mixed samples that were then heat treated. The zinc-kaolinite samples comprised from about 0.1 wt. % to about 1 wt. % zinc oxide were calcined at temperature intervals of 50° C. over the temperature range of from 500° C. to 650° C. for a period of 1 hour. The resulting kaolinite samples were then examined via x-ray diffraction (XRD), differential thermal analysis (DTA), and thermogravimetric analysis (TGA), to determine the degree of crystallinity and dehydroxylation.

The zinc-metakaolin powders were used to replace 15 wt. % of Portland cement. Thus, a cement paste of 28.6 wt. % water, 60.7 wt. % cement, and 10.7 wt. % zinc-metakaolin powder was examined via isothermal calorimetry for cement hydration properties. The hydration properties can be indicative of the resulting mixture's setting or hardening time. Results from the calorimetry analysis illustrate that metakaolins with higher amounts of zinc oxide and a low degree of dehydroxylation retarded hydration reactions, but the maximum heat flow increased for each of the zinc containing metakaolin samples as compared to metakaolin without zinc compounds.

Compressive Strength: From each sample, 50 mm mortar cube samples were prepared. The compressive strength of each mortar cube was then determined. Mortars consisted of Type I portland cement with 15 wt % metakaolin substitute and Ottawa silica sand. The metakaolins tested included 1.0 wt % ZnO flux addition calcined at each prescribed calcination temperature (500° C., 550° C., 600° C., 650° C.). Samples containing portland cement and portland cement with 15 wt % metakaolin substitute and no ZnO served as compressive strength benchmarks. Compressive strength samples were demolded after 24 hours and placed in a lime-water bath held at 23° C. until testing. Nine mortar cubes for each mixture were tested at 3, 7, and 28 days.

The average three day compressive strength results reveal the addition of ZnO flux to metakaolin-cement systems maintains early strength development compared with non-ZnO metakaolin mixtures. FIG. 1 illustrates the compressive strength (psi) of the resulting mortar cubes after 28 days, where the mortar cubes comprised cement-ottawa sand mixtures with pure cement (control), 15 wt. % metakaolin-SCM with metakaolin calcined at each temperature (K500, K550, K600, K650) and metakaolin-ZnO SCM with metakaolin and 1 wt. % ZnO calcined at each temperature (KZ500, KZ550, KZ600, KZ650). The zinc containing metakaolin samples exhibited a significant increase in the 28-day compressive strength of the resulting concrete, indicating improved pozzolanic activity of the metakaolin. Of the samples evaluated, the optimum zinc containing metakaolin material comprised about 1 wt. % zinc oxide, was calcined at about 650° C., and exhibited no retardant, high heat flow, and high compressive strength.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for preparing a concrete composition, the method comprising contacting a calcined clay, a zinc containing compound, and a cement; wherein after contacting, at least a portion of the zinc containing compound is at least partially encapsulated by the calcined clay.

2. The method of claim 1, wherein the zinc containing compound is from a zinc containing waste stream.

3. The method of claim 1, wherein the zinc containing compound comprises zinc chloride, zinc sulfate, zinc sulfide, zinc oxide, or a combination thereof.

4. The method of claim 1, wherein the zinc containing compound comprises zinc oxide.

5. The method of claim 1, wherein the zinc containing compound is first contacted with an uncalcined clay to form a mixture, and then the mixture is calcined.

6. The method of claim 1, wherein the clay comprises illite, montmorillinite, kaolinite, or a combination thereof.

7. The method of claim 1, further comprising contacting an additional material comprising limestone, an inert filler, zeolites, blast furnace slag, silica fume, flyash, or a combination thereof.

8. The method of claim 1, wherein after contacting, at least a portion of the zinc containing compound is encapsulated or substantially encapsulated by the calcined clay.

9. The method of claim 1, wherein after contacting, the zinc containing compound is encapsulated by the calcined clay.

10. The composition produced by the method of claim 1.

11. A composition comprising a calcined clay, a zinc containing compound, and cement, wherein at least a portion of the zinc containing compound is at least partially encapsulated by the calcined clay.

12. The composition of claim 10, further comprising an additional material comprising limestone, an inert filler, zeolites, blast furnace slag, silica fume, flyash, or a combination thereof.

* * * * *